3,501,725
FIXED STATOR ROTARY SOLENOID
Karl Richard Olesen, 2156 Hedding St.,
San Jose, Calif. 95128
Filed Aug. 14, 1968, Ser. No. 752,718
Int. Cl. H01h 7/08, 7/12
U.S. Cl. 335—272                                    7 Claims

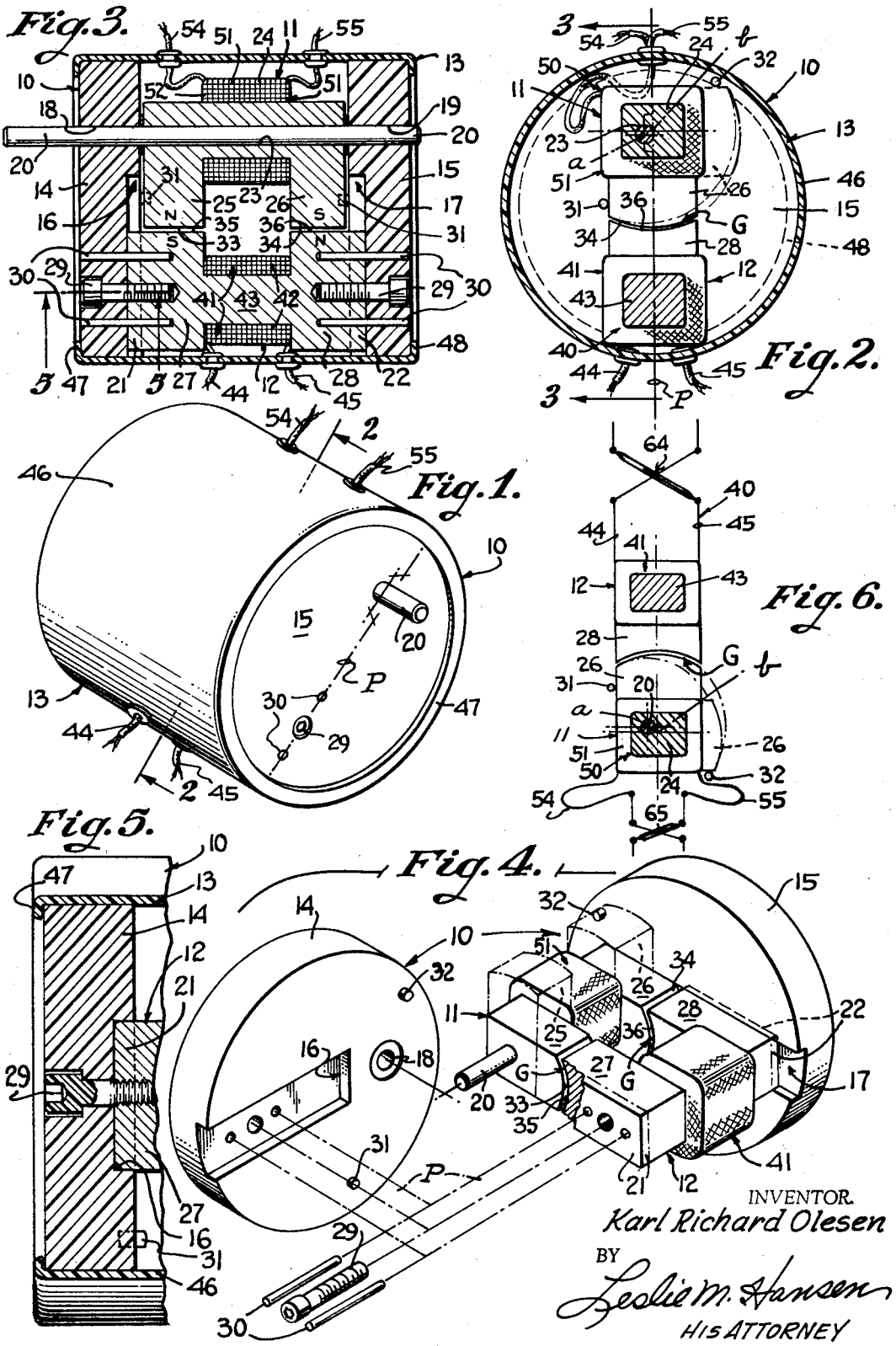

ABSTRACT OF THE DISCLOSURE

A fixed stator dual acting rotary solenoid secured to a non-magnetic shaft mounted for rotary movement in offset relation to the rotor to provide an air gap between the rotor and fixed stator which gradually increases in spacing as the rotor is repelled. A fixed stator interlockingly related to the end walls of the unit to form a structural part thereof while providing the core and arms of field coils which effect the repelling and attracting magnetic action.

BACKGROUND

Rotary solenoids have heretofore been constructed in various manners and forms to effect a partial rotation of a shaft connected to various instruments for controlling or changing the action thereof. Such prior known rotary solenoids usually have a multiplicity of parts requiring intricate assembly and costly manufacture. Prior known structures may be found in class 317 subclass 197 of the United States Patent Office files.

STATEMENT OF INVENTION

This invention is directed to a fixed stator dual acting rotary solenoid embodying certain principles of construction and operation comparable to that of my copending application Serial No. 752,719 filed on Aug. 14, 1968 concurrently herewith.

The present invention has as its principal object the provision of a rotary solenoid which is simple in construction, economical to manufacture and highly efficient in use. In this connection it is an object to provide a rotary solenoid having a minimum number of parts requiring the least amount of machining, labor and cost of assembly and manufacture.

It is another object to provide a rotary solenoid in which the rotor is mounted for swinging movement relative to a stator fixed within a frame of which the stator is a structural part.

It is a further object to provide the foregoing arrangement between a pair of non-conductive end walls about which a canister type cover is mounted for concealing and protecting the magnetic coils thereof.

It is yet another object to provide a rotary solenoid in which the fixed stator is interlockingly related to the non-conductive end walls of the frame in a novel manner.

These and other objects of the present invention will become more apparent from a reading of the following description in the light of the accompanying drawing in which:

FIG. 1 is a perspective view of a rotary solenoid embodying the present invention.

FIG. 2 is a section through the structure of FIG. 1 taken substantially along line 2—2 thereof.

FIG. 3 is a section through FIG. 2 taken along line 3—3 thereof.

FIG. 4 is a perspective view of a partial assembly of the device of FIGS. 1, 2 and 3 with parts thereof removed for purpose of illustration.

FIG. 5 is a fragmentary detail section of a portion of FIG. 3 and taken along line 5—5 thereof.

FIG. 6 is a schematic diagram of the coil and electrical wiring system of the embodiment of FIGS. 1 through 5.

GENERAL DESCRIPTION

The rotary solenoid 10 of the present invention in general includes a rotor 11 and stator 12 mounted within a housing 13 of non-conductive, non-magnetic material.

DETAILED DESCRIPTION

The present invention comprises the structural relationship and assembly of the foregoing general arrangement. In this connection the housing 13 comprises a pair of end walls 14–15 between which the stator 12 and rotor 11 are mounted. Although these end walls 14 and 15 are shown to be of circular form it will be appreciated that they may be square, rectangular or polygonal in shape if required. For purposes of the present description suffice it to say that the end walls have identical perimetrical configuration and that the rotor 11 and stator 12 are arranged on a common plane P within the housing 13 thus formed. In the drawings this plane P is along the line 3—3 in FIG. 2 and detailed in FIG. 3 at one diametrical axis of the circular end walls 14 and 15.

Each end wall 14 and 15 is provided with a milled out groove 16 and 17, respectively, on its inner surface and along the plane P. In addition to the grooves 16 and 17 each end wall 14 and 15 is bored to provide a bearing 18 and 19, respectively, for a non-magnetic shaft 20 which forms a part of the rotor 11.

The stator 12 provides a structural connection between the side walls 14 and 15 by having its opposite end edges 21 and 22 seated in the grooves 16 and 17 of the respective side walls 14 and 15. The stator 12 is of a length, between its end edges 21 and 22, slightly greater than the width of the rotor 11 along its rotary axis $a$.

The rotor 11 is a U-shaped iron member having the non-magnetic shaft 20 press fit or sweat into a bore 23 formed through the rotor at the zone of its bight portion 24 from which its leg portions 25 and 26 extend toward the stator 12. In the present disclosure the stator 12 is shown to be a U-shaped member of ferrous metal adapted to be magnetized. The U-shaped stator has leg portions 27 and 28 which extend directionally toward the leg portions 25 and 26 of the rotor. The stator is of a width slightly greater than the rotor so as to interlockingly extend into and seat within the grooves formed in the walls 14–15. The stator 12 is secured to the respective end walls 14 and 15 by a machine screw 29 at each side and is keyed in oriented condition relative to the end walls by means of shear pins 30 as well as the walls of the groove 16 and 17 as the case may be.

The rotor 11 is fixedly mounted on the shaft 20 which is journaled in the bearings 18–19 in the end walls 14 and 15. The rotor 11 is of a width slightly less than the space provided between the inner surfaces of the end walls 14–15 as established by the width of the stator 12. The rotor 11 and shaft 20 are free to turn as a unit about the axis $a$ of the shaft and bearings 18 and 19 at the end walls 14–15. This rotary movement of the rotor 11 is limited by stop means 31 and 32 provided on the inner surface of at least one but preferably each of the end walls 14–15. These stop means 31 and 32 are projections formed on or extending from the inner surfaces of the end walls 14–15 at the desired limits of movement required of the rotor. In the present disclosure the rotor 11 is movable within one quadrant or 90 degree zone as defined between the stop means 31 and 32 (see FIGS. 2 and 6).

For purposes of an understanding of the present invention the two extreme limits of movement of the rotor 11 are defined as in alignment with the stator 12 and to a position at right angles, i.e., perpendicular or normal thereto.

Referring now to FIG. 2 it will be noted that the axis *a* about which the shaft 20 and rotor 11 swing is offset relative to the plane P or diametric center of the housing. This offset is best described in relation to the geometric center or axis *b* of the bight portion 24 of the rotor. This axis *b* lies in the plane P when the rotor 11 is in alignment with the latter and the stator 12. The axis *a* is offset opposite to the direction in which the leg portions 25 and 26 of the rotor extend when in a position normal or perpendicular to the stator 12 and less than the radial distance of the end faces 33–34 of the rotor relative to the axis *b*. When the rotor 11 is in alignment with the stator 12 the leg portions 25 and 26 of the rotor are in alignment with the leg portions 27 and 28 of the stator. For this reason the free end faces 33 and 34 of the leg portions 25 and 26 are curved on an arc struck on a radius *r* from the axis *b* at the geometric center of the bight portion 24 (FIG. 2). The opposing end faces 35 and 36 of the leg portions 27 and 28 of the stator 12 are likewise curved on a similar arc struck at a slightly greater radius from the axis *b* to provide an air gap G between them.

By the foregoing arrangement it will be noted (FIGS. 2 and 6) that as the rotor swings away from alignment with the stator toward normal position, the gap G between curved faces 33–35 and 34–36 increases. The stop means 31 which engage the leg portions 25 and 26 when they are aligned with the leg portions 27 and 28 of the stator assure clearance between the arcuate faces 33–35 and 34–36 so that no binding action can occur between them at aligned position.

Thus it may be said that the rotor and stator when aligned have opposing arcuate faces providing a gap of close parallel proximity which gap is adapted to increase and open up upon movement of the rotor toward normal due to the arc of swing being on a lesser radius and offset in a direction opposite to that in which the rotor swings.

Means 40 for maintaining the rotor 11 in alignment with the stator 12 consists of a coil 41 of electrical wire 42 wound about the bight portion 43 of the U-shaped stator. Thus the bight portion 43 becomes the core of the coil 41 providing an electro-magnetic stator which is fixed within the body 13 of the unit 10. Electrical current is supplied to the coil 42 via end conductor wires 44 and 45 of the winding 42 which extend through suitable grommets in a cover or shell 46 of the unit 10.

The cover or shell 46 is shown to be of the canister type which is a cylinder of non-conductive material having sliding fit over the peripheries of the end walls 14 and 15. The outer edges 47 and 48 of this shell 46 are peened over to the end walls 14–15 to secure the shell to them and provide a dust proof cover for the housing 13 of the rotor and stator.

When electrical current is supplied to the coil 41 via the wires 44–45 the U-shaped member 12 becomes fixed electromagnetic stator. The ends of the leg portions 27 and 28 thus become opposite field poles N and S (FIG. 3) between which magnetic eddy currents flow.

Such magnetic field between the pole ends 35 and 36 of the leg portions 27 and 28 of the stator 12 attract the leg portions 25 and 26 of the rotor 11 toward them. Thus the rotor 11 is attracted into alignment with the stator 12 along the plane P.

Means 50 for causing the rotor 11 to swing toward normal position, perpendicular to the stator 12, consists of a coil 51 of electrical wire 52 wound about the bight portion 24 of the U-shaped rotor 11. Thus the bight portion 24 becomes the core of the coil 51 providing an electro-magnetic rotor 11. Electrical current is supplied to the coil 51 via limp flexible conductor wires 54 and 55 which extend from the ends of the winding 52 through insulation grommets in the shell or cover 46.

When electrical current is supplied to the coil 51 via the wires 54–55 the U-shaped rotor becomes an electromagnet establishing north and south polarity at the curved end faces 33 and 34 of the leg portions 25 and 26 of the rotor. With the winding of the wire 52 coiled to establish identical polarity at the faces 33 and 35 as well as at faces 34 and 36, the magnetic fields at each will repel the other and thus cause the rotor 11 to swing from aligned to normal position (dotted lines FIGS. 2 and 6). However, when the flow of current through the wires 42 and 52 is such as to establish opposite polarities at faces 33–35 and 34–36, the leg portions 25 and 26 of the rotor 11 will be attracted so as to swing back toward and into alignment with the leg portions 27 and 28 of the stator 12.

Referring to FIG. 6 it will be noted that either or both sets of conductors 44–45 and 54–55 may be controlled by an alternating switch 64 and 65, respectively.

By this arrangement it will be noted that the magnetic attraction as well as the magnetic repelling forces can be doubled such as to create a greater torque pull upon the shaft 20. Therefore, should necessity require that a greater work force be applied to the rotary torque of the shaft 20 both electro-magnetic coils 41 and 51 may be activated in unison to create opposing magnetic fields at the gap G for either the repelling or the attracting action.

The interlocking relation between the stator 12 and the end walls 14–15 at the grooves 16 and 17 assures firm fixation of the stator 12 within the housing 13. By the same token the stop means 31 and 32 may be sufficiently structurally solid to assure limit of movement of the rotor between its two extreme positions.

While I have described the foregoing fixed stator rotary solenoid in specific detail it will be appreciated by those skilled in the art that the same may be varied, altered and/or modified without departing from the spirit or scope of the invention therein. I therefore desire to avail myself of all variations, alterations and/or modifications as may fairly come within the purview of the appended claims.

What I claim as new and desire to protect by Letters Patent is:

1. A rotary solenoid comprising
    (a) a pair of non-conductive end walls,
    (b) a groove formed identically on the inner face of each of said end walls,
    (c) a stator having end edges interlockingly arranged in the respective grooves of said end walls for maintaining said end walls in spaced parallel relation,
    (d) means for securing the end edges of said stator to the respective end walls,
    (e) a shaft journaled in said end walls along an axis offset relative to the plane of said stator,
    (f) a U shaped rotor having its bight portion mounted on and secured to said shaft and having its leg portions disposed to extend toward and in alignment with the plane of said stator and for swinging movement in a direction opposite to the offset relation of said shaft relative to the plane of said stator,
    (g) a coil of electrical wire wound about said stator in a zone thereof between the leg portions of said rotor for magnetizing said stator to establish opposite magnetic field pole faces adjacent the end edges of said stator for attracting the leg portions of said rotor into alignment with the plane of said stator,
    (h) a coil of electrical wire wound about the bight portion of said rotor adapted to establish opposing pole field currents at the ends of the leg portions thereof for repelling the magnetic poles on said stator for swinging said rotor away from said stator in a direction opposite to the offset relation of the axis of said shaft relative to the plane of said stator, and
    (i) means for limiting movement of said rotor beyond a normal, perpendicular disposition relative to the plane of said stator, 2. The rotary solenoid in accordance with claim 1 including means on at least one of said side walls for limiting swinging movement of said rotor beyond normal, perpendicular disposition relative to the plane of said stator.

3. The rotary solenoid in accordance with any one of claims 1 and 2 including alternating switch means electrically connected to the coils of said rotor and said stator for reversing the flow of electrical current through one of said coils for alternating the direction of swing of said rotor between its limits of movement.

4. The rotary solenoid in accordance with claim 3 in which said end walls have identical perimetrical configurations, and a sheet-like cover of non-magnetic material mounted on the perimeters of said end walls for concealing and enclosing the rotor and stator therebetween.

5. The rotary solenoid in accordance with claim 4 in which the leg portions of said rotor and the opposite magnetic pole faces of said stator have opposing arcuate faces spaced in close parallel proximity and each struck on a radius slightly greater than the distance of the offset axis of said shaft from the magnetic pole faces of said stator whereby to provide an air gap between them which increases in spacing upon movement of said rotor toward normal disposition relative to the plane of said stator.

6. The rotary solenoid of claim 5 in which said stator comprises a U shaped iron member having its leg portions embracing the coil thereon and extending toward said rotor with ends providing the opposite magnetic pole faces thereof.

7. The rotary solenoid in accordance with that of claim 6 in which the leg portions of said rotor and stator each have opposing arcuate faces spaced in close parallel proximity and each struck on a radius slightly greater than the distance of the offset axis of said shaft from the magnetic pole faces of said stator whereby to provide an air gap which increases in spacing during movement of said rotor toward normal disposition relative to the plane of said stator.

References Cited

UNITED STATES PATENTS

| | | | |
|---|---|---|---|
| 3,158,796 | 11/1964 | Musgrave | 335—272 X |
| 3,435,394 | 3/1969 | Egger | 335—272 |

BERNARD A. GILHEANY, Primary Examiner

R. N. ENVALL, Jr., Assistant Examiner

U.S. Cl. X.R.

310—36